E. C. CHILDRESS.
STUBBLE CUTTER.
APPLICATION FILED AUG. 2, 1919.

1,436,792.

Patented Nov. 28, 1922.

INVENTOR
Emmitt C. Childress
by
Owen, Owen & Crampton

Patented Nov. 28, 1922.

1,436,792

UNITED STATES PATENT OFFICE.

EMMITT C. CHILDRESS, OF EDNA, TEXAS.

STUBBLE CUTTER.

Application filed August 2, 1919. Serial No. 314,979.

*To all whom it may concern:*

Be it known that I, EMMITT C. CHILDRESS, a citizen of the United States, and a resident of Edna, in the county of Jackson and State of Texas, have invented a certain new and useful Stubble Cutter; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention has for its object to provide a means for cutting vegetation growth in advance of the operation of an agricultural implement such as cutting the corn stalks in advance of turning the soil with a plow. In my invention the stubble or vegetation cutter is secured to the agricultural implement such as to the beam of a plow and forward movement of the plow produces the cutting operation of the cutter.

The construction containing my invention may partake of different forms. I have selected one of the constructions containing my invention as an example and shall describe it hereinafter. The construction selected is illustrated in the accompanying drawings.

Figure 1:
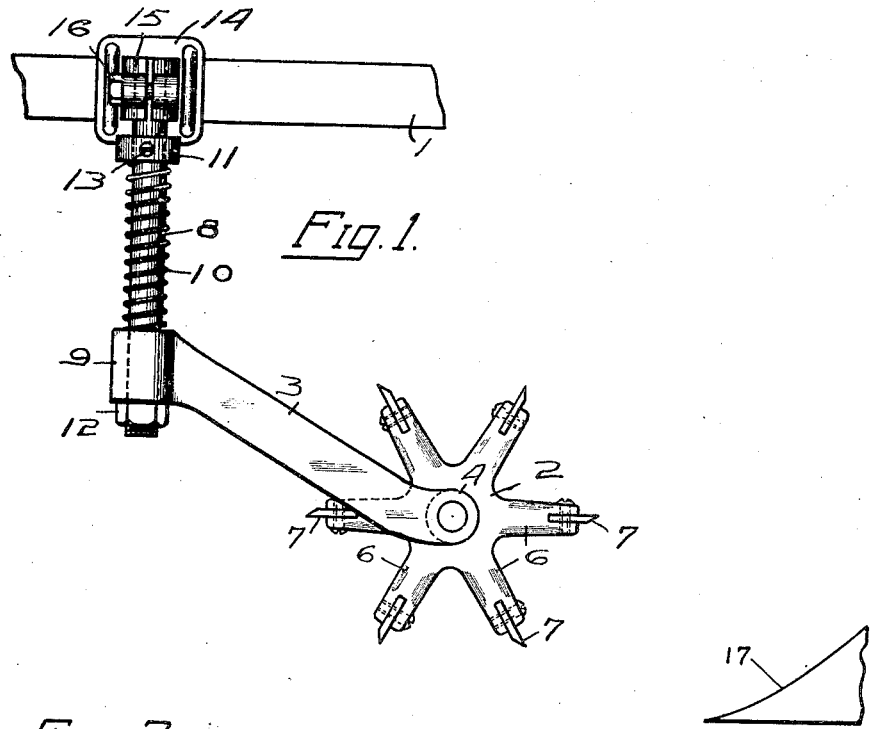
Figure 2:
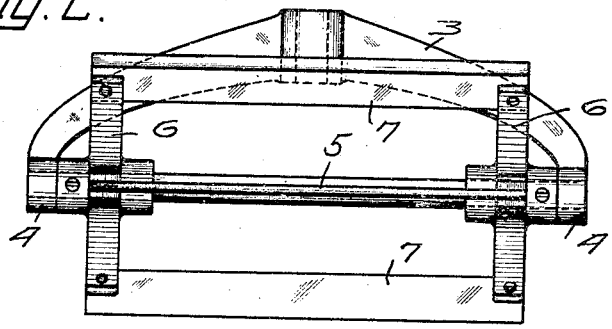

Figure 1 of the drawings illustrates a side view of the cutter. Fig. 2 illustrates an end view of the cutter.

In Fig. 1, 1 is the plow beam to which the stubble cutter 2 is connected. The cutter has a pair of arms 3 that form a yoke that spreads or extends to the ends of the cutter. The yoke is provided with bearings 4 in which is located a shaft 5. The cutter is connected to the shaft 5. It consists of a pair of spiders 6, in the slotted ends of which are bolted the blades 7 as illustrated in Fig. 1 and so as to form a paddle-wheel construction that extends across the path and in advance of the plow 17. The yoke or arms 3 are mounted on a shaft or vertically disposed rod 8 and so as to permit sliding vertical movements along the rod 8. The bearing 9 of the yoke 3 is of sufficient length to permit sliding movements along the rod 8 without binding with the rod. This permits the beam of the plow to shift in position quite readily with the cutter and also permits the cutter to adjust itself to irregularities of the surface of the soil. To cause the return of the cutter to its normal position with reference to the beam of the plow, a spring 10 is located on the shaft 8 and intermediate the beam of the plow. The shaft or rod 8 is provided with an enlarged end 11 that forms a shoulder against which the spring presses to yieldingly force the yoke 3 to the lower end of the shaft or rod 8. A nut 12 is threaded on to the end of the shaft 8 to limit the downward vertical movement of the yoke 3. The enlarged portion 11 on the shaft 8 may be made in the form of a collar which may be adjusted and secured by the key bolt 13. The shaft 8 may be secured in any suitable manner to the plow beam 1 as by the plate 14 which is bolted to the beam 1 and to which the shaft 8 is secured by the clamping split collar 15 which is clamped by means of the bolt 16.

In the operation of the cutter the cutter is rotated by the blades striking the ground and the beam and plow being carried forward. In its rotating and advancing movements the blades 7 cut all the stubble or other vegetation growth located in advance of the plow. This avoids going over the field and cutting down the corn or other vegetation growth before the plowing operations begin.

I claim :

In combination with a plow a cutter having a plurality of blades extending transversely the path of the plow and located in advance of the plow, a pair of rotative spiders connected to the ends of the blades, a yoke having bearings for rotatively supporting the spiders, the center of the yoke located well in advance of the cutter, and substantially in the same horizontal plane in which the bearings are located, a vertical rod connected to the plow beam and extending through the yoke, an adjustable collar located on the rod, a compression spring located on the rod and intermediate the yoke and the collar for yieldingly resisting the vertical sliding movements of the yoke along the rod.

In testimony whereof I have hereunto signed my name to this specification.

EMMITT C. CHILDRESS.